United States Patent [19]

Yanagisawa

[11] Patent Number: 5,128,786

[45] Date of Patent: Jul. 7, 1992

[54] LIQUID CRYSTAL DISPLAY DEVICE HAVING LIGHT SHIELDING MEMBER WITH DISCONTINOUS PATTERN

[75] Inventor: Masaki Yanagisawa, Tokyo, Japan

[73] Assignee: Casio Computer Co., Ltd., Tokyo, Japan

[21] Appl. No.: 551,133

[22] Filed: Jul. 10, 1990

[30] Foreign Application Priority Data

Jul. 14, 1989 [JP] Japan .................. 1-82146[U]

[51] Int. Cl.⁵ .............................................. G02F 1/13
[52] U.S. Cl. ...................................... 359/67; 359/79; 359/68; 359/54
[58] Field of Search ................ 350/334, 333, 339 R, 350/339 F; 359/54, 67, 68, 79

[56] References Cited

U.S. PATENT DOCUMENTS

| | | | |
|---|---|---|---|
| 4,569,574 | 2/1986 | Masaki et al. | 350/334 |
| 4,591,240 | 5/1986 | Masaki et al. | 350/339 R |
| 4,805,995 | 2/1989 | Torigoe | 350/339 F |
| 4,828,364 | 5/1989 | Saito et al. | 350/339 F |
| 4,964,702 | 10/1990 | Sugimoto et al. | 350/339 F |

FOREIGN PATENT DOCUMENTS

| | | | |
|---|---|---|---|
| 3235277 | 3/1984 | Fed. Rep. of Germany | 350/334 |
| 57-190912 | 11/1982 | Japan . | |
| 58-120287 | 7/1983 | Japan . | |
| 0249120 | 12/1985 | Japan | 350/334 |
| 0180933 | 7/1988 | Japan | 350/334 |
| 0184706 | 7/1988 | Japan | 350/339 F |
| 63-226626 | 9/1988 | Japan . | |
| 0241522 | 10/1988 | Japan | 350/339 F |
| 0167823 | 7/1989 | Japan | 350/334 |

Primary Examiner—Rolf Hille
Assistant Examiner—Tan Ho
Attorney, Agent, or Firm—Frishauf, Holtz, Goodman & Woodward

[57] ABSTRACT

A liquid crystal display device includes a pair of substrates opposed to each other, a plurality of first electrodes provided on one of the paired substrates, a plurality of second electrodes mounted over the other base plate to oppose the first electrodes, liquid crystal material interposed between the first and the second electrodes to form a plurality of image elements at a plurality of positions corresponding to those points of the first and second electrodes which are opposed to each other, and a black mask for shielding light from leaking through clearances between the adjacent image elements. The image elements are arranged like a matrix and the black mask is formed discontinuous in the vertical and/or horizontal direction.

13 Claims, 3 Drawing Sheets

LIQUID CRYSTAL DISPLAY DEVICE HAVING LIGHT SHIELDING MEMBER WITH DISCONTINOUS PATTERN

BACKGROUND OF THE INVENTION

1. Field of the Invention

The present invention relates to a liquid crystal display device having a plurality of image elements arranged like a matrix and also having members for shielding light from leaking through a net-like area between the adjacent image elements.

2. Description of the Related Art

In the liquid crystal display device having a plurality of image elements arranged like a matrix, light leaks through a net-like area between the adjacent image elements because it is difficult to control the light not to pass through the net-like area. This leaked light causes the contrast of the display device to be lowered. It has been therefore proposed to arrange a member for shielding light from leaking through the net-like area (which will be hereinafter referred to as a black mask) between the image elements.

A conventional liquid crystal display device provided with the black mask is shown in FIGS. 1 through 3. Reference numerals 1 and 2 denote a pair of upper and lower transparent substrates (glass plates, for example) opposed to each other with a liquid crystal layer L interposed between them. Striped display electrodes 3 and 4 each being a transparent electroconductive film made of Indium-Tin-Oxide, for example, are mounted on the opposing surfaces of the paired substrates 1 and 2. One group of these display electrodes 3 and 4 is used as scanning electrodes while the other group is used as signal electrodes, and these display electrodes 3 and 4 extend perpendicular to each other. Aligning films 5 are formed on the opposing surfaces of these display electrodes 3 and 4. Reference numeral 6 denotes a black mask which is a metal film made of Cr (Chromium), for example. The black mask 6 is formed on the opposing surface of one of the paired substrates 1 and 2, or on the opposing surface of the lower substrate 2, for example, so as to be located under the striped display electrodes 4. This black mask 6 is shaped like a square net to correspond to the plural straight slit like areas between the adjacent display electrodes 3 on the opposing surface of the upper substrate 1 and those between the adjacent display electrode 4 on the opposing surface of the lower substrate 2. The black mask 6 is formed by forming a metal film made of Cr, for example, on the opposing surface of the lower base plate 2 and then patterning the metal film by means of the photolithography. This black mask 6 is coated by a transparent electrically insulating film 7 made of SiO$_2$, for example, and formed on the opposing surface of the lower base plate 2 to cover the whole of the opposing surface, and the striped display electrodes 4 are formed on the insulating film 7.

In this liquid crystal display device, those parts of the liquid crystal layer L, corresponding to the opposing parts of the display electrodes 3 and 4 which are opposed to one another, form the image elements and light which tends to pass through the net-like area between these image elements is shielded by the black mask 6. This liquid crystal display device can thus display highly-contrasted and clear images.

The liquid crystal color display device provided with red, green and blue color filters has the same construction as that of the above-described conventional liquid crystal display device. The liquid crystal color display device is disclosed in the published and unexamined Japanese Patent Application No. 57-190912 The display electrodes 4 are formed on a protection film which covers the color filters. The liquid crystal color display device can also display highly-contrasted and clear images because it can prevent light from leaking through the net-like area between the adjacent image elements.

In the case of the above-mentioned liquid crystal display device wherein the display electrodes 4 are electrically insulated from the black mask 6 by the insulating film 7 interposed between them, however, one of the display electrodes 4 is short-circuited to the black mask 6 and voltage supplied to this display electrode 4 is supplied to the black mask 6 when the insulating film 7 which covers the black mask 6 has a defect (a) such as a pin hole at that position which corresponds to the display electrode 4 (see FIG. 3). Since the black mask 6 is formed to correspond to the whole area of the liquid crystal layer L, the electrical potential of the black mask 6 acts on the whole area of the liquid crystal layer L when voltage is supplied to the short-circuited display electrode 4. The display quality of the liquid crystal display device becomes thus degraded all over its display area when voltage is supplied to the short-circuited display electrode 4.

When the insulating film 7 has a plurality of defects (a) therein, the display quality of the device is lowered all over its display area. In addition, plural display electrodes 4 are short-circuited to one another via the plural defects (a) and the black mask 6, and this causes voltage supplied to one of the short-circuited display electrodes 4 to be supplied to the remaining short-circuited display electrodes 4. As the result, display images cannot be accurately controlled.

SUMMARY OF THE INVENTION

The present invention is therefore intended to eliminate the above-mentioned drawbacks.

Accordingly, the object of the present invention is to provide a liquid crystal display device capable of reducing those areas on a display where the quality of display is lowered and displayed images are wrongly controlled because of the short-circuiting of display electrodes relative to a black mask which is an electrically conductive film, thereby enabling the quality of display to be kept higher.

This object of the present invention can be achieved by a liquid crystal display device having a plurality of image elements arranged like a matrix, said device comprising a pair of substrates arranged to oppose to each other; a plurality of first electrodes mounted over one of the paired substrates; at least one of second electrode mounted over the other of the paired substrates to oppose to the plural first electrodes; liquid crystal material interposed between the first and the second electrodes and whose plural areas corresponding to those portions of the first and second plural electrodes which are opposed to each other form plural image elements whose light transmissions are selectively controlled by selectively supplying current or voltage having a predetermined value to the first and second electrodes; an electrically conductive opaque member mounted to have a discontinuous pattern on at least one of the paired substrates at positions corresponding to clearances between the adjacent image elements, and serving to substantially shield light passing through the clearances between the adjacent image elements; and an electrically insulating member interposed between the opaque member and the plural first electrodes.

In the case of the liquid crystal display device having the above-described arrangement according to the present invention, even when one defect like a pinhole is produced in the insulating member interposed between the opaque member which serves as a black mask and the first electrodes so that the opaque member is short-circuited to one of the first electrodes on the insulating member, voltage supplied to this short-circuited first electrode is supplied only to that part of the opaque member which is short-circuited to the first electrode and the remaining part of the opaque member which is discontinuous from the short-circuited part thereof has no potential in spite of the voltage supplied to the first electrode. Therefore, the short-circuited area in the opaque member which is caused by one defect like a pinhole in the insulating member located between the opaque member and the first electrodes can be limited to keep small the area of lowering the display quality on the display. The display quality on the display can be thus kept high.

Even when plural defects are produced in the insulating member and the opaque member is short-circuited to the plural first electrodes corresponding to the plural defects, the short-circuited first electrodes which are located remote from one another are not short-circuited to one another through the opaque member. Therefore, the area of lowering the display quality on the display can be limited. In addition, the displaying area of wrongly controlled images which is caused by plural defects like pinholes in the insulating member can be limited or eliminated. The quality of display can be thus kept higher.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
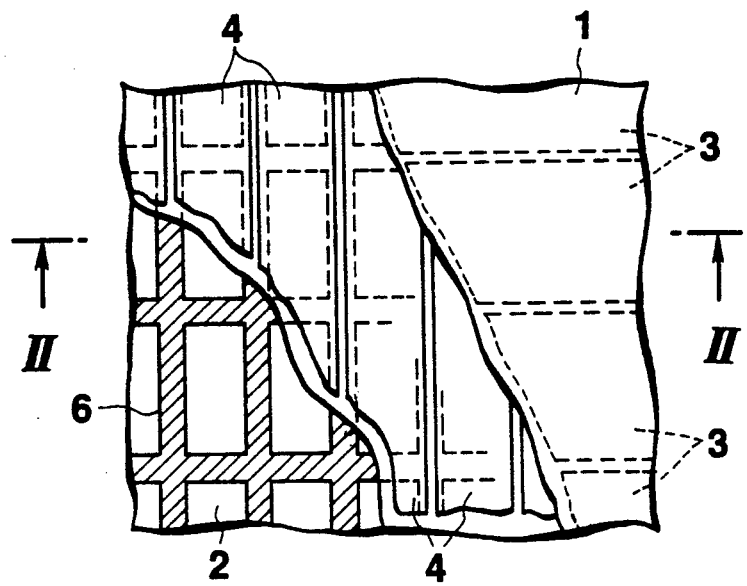
FIG. 1 is a plan view schematically showing a conventional liquid crystal display device, a part of which cut away.
Figure 2:
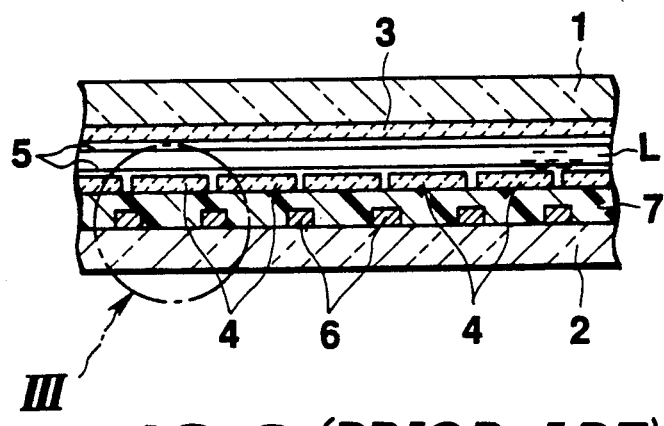
FIG. 2 is a schematical sectional view taken along a line II—II in FIG. 1.
Figure 3:
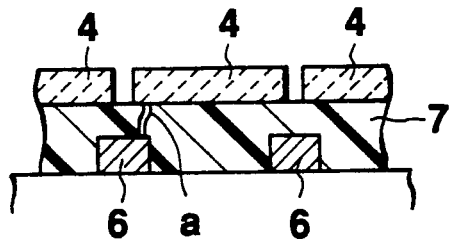
FIG. 3 is an enlarged view schematically showing a part of the display device in FIG. 2.
Figure 4:
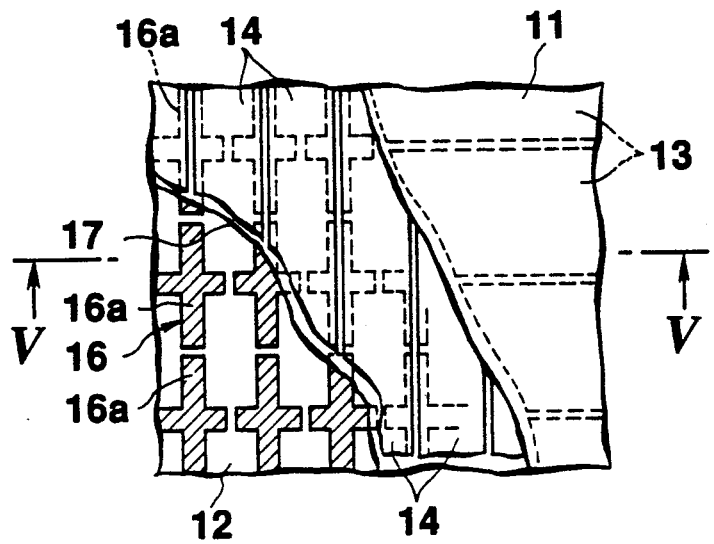
FIG. 4 is a plan view schematically showing a part of a display in a liquid crystal display device according to an embodiment of the present invention, a small area of which cut away.
Figure 5:
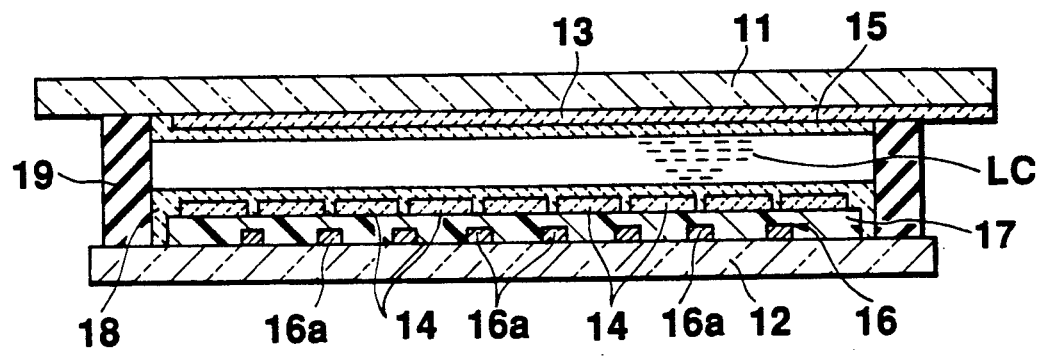
FIG. 5 is a schematic sectional view taken along a line V—V in FIG. 4.

In FIGS. 4 and 5, reference numerals 11, 12 denote a pair of transparent substrates (glass plates, for example) opposed to each other with a liquid crystal layer LC interposed between them. Striped display electrodes 13 and 14 which are transparent electrical conductive films made of Indium-Tin-Oxide, for example, are formed respectively on the opposing surfaces of the paired substrates 11 and 12. One group (display electrodes 13, for example) of these display electrodes 13 and 14 serves as scanning electrodes while the other group (display electrodes 14, for example) thereof as signal electrodes. The scanning electrodes 13 are striped transparent electrically conductive film pieces horizontally (right and leftwardly in FIG. 4) extending on the opposing surface (the under surface in FIG. 5) of the substrate 11 and arranged in the vertical direction (up and down direction in FIG. 4) with a slender clearance interposed between their adjacent ones. An aligning film 15 is formed on the scanning electrodes 13. The striped signal electrodes 14 are formed on an electrically insulating film 17, which is formed on the opposing surface (the upper surface in FIG. 5) of the substrate 12 to cover a black mask 16 which will be described in detail later. The signal electrodes 14 are striped transparent electrically conductive film pieces vertically (up and down direction in FIG. 4) extending on the insulating film 17 and arranged in the horizontal direction (right end left direction in FIG. 4) with a slender clearance interposed between their adjacent ones. The extending direction of the striped display electrodes 14 is perpendicular to that of the striped display electrodes 13. Another aligning film 18 is formed on the signal electrodes 14. A space between the aligning films 15 and 18 on the opposing surfaces of the paired substrates 11 and 12 is sealed by sealing members 19 interposed between the peripheral edge portions of the opposing surfaces. And, the sealed space is filled with the liquid crystal LC.

Figure 6:
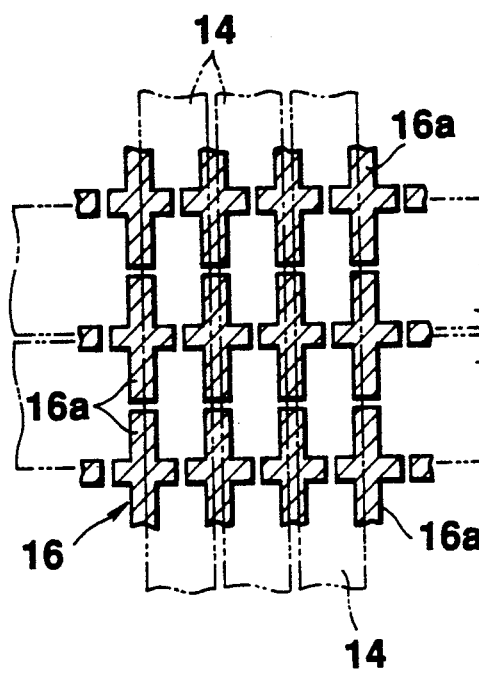
FIG. 6 is a plan view schematically showing a black mask used in the display device shown in FIG. 4.

The black mask 16 is a thin electrically conductive metal film, having an excellent light shielding ability, formed on the opposing surface of one (the substrate 12 in this embodiment) of the paired substrates 11 and 12, and made of Cr (Chromium) for example. The black mask 16 is shaped like a cross stripe or square net, corresponding to the plural straight slit like areas between the adjacent scanning electrodes 13 on the substrate 11 and those between the adjacent signal electrodes 14 on the substrate 12. As shown in FIG. 6, the black mask 16 in this embodiment is divided into a plurality of cross-shaped mask units 16a, cutting off its vertical and horizontal lines at substantially the same pitches as those of the vertically-and horizontally-arranged scanning and signal electrodes 13 and 14. Namely, the black mask 16 forms a discontinuous pattern. Each of its vertical lines is cut off at each position corresponding substantially to the center of the width of the each scanning electrode 13 while each of its horizontal lines at each position corresponding substantially to the center of the width of the each signal electrode 14. The width of the each cut-off portion of the black mask 16 is about several μm. The black mask 16 is formed in such a way that a metal film made of Cr, for example, is formed on the base plate 12 and then patterned according to the photolithography. The black mask 16 is coated by the transparent electrically insulating film 17 which is formed on the whole of the opposing surface of the substrate 12 and which is made of $SiO_2$, for example. The signal electrodes are formed on this insulating film 17.

According to the above-described liquid crystal display device, the black mask 16 is fogged as a discontinuous pattern because it is constructed by a plurality of mask units 16a independent of each other. Therefore, even when one defect such as a pinhole is produced in the insulating film 17 which covers the black mask 16, and one of the mask units 16a corresponding to the defect is short-circuited to one of the signal electrodes 14 also corresponding to the defect, voltage supplied to the short-circuited signal electrode 14 is supplied only to the short-circuited mask unit 16a. Only one mask unit 16a has a potential responsive to the voltage supplied. The remaining mask units 16a discontinuous from the short-circuited mask unit 16a have no potential even when voltage is supplied to the short-circuited signal electrode 14. The area of the black mask 16, which has potential to degrade the quality of display, can be therefore limited only to the short-circuited mask unit 16a and kept as small as possible.

Further in the above described liquid crystal display device, even when a plurality of defects are produced at plural points in the insulating film 17 and some of the plural mask units 16a corresponding to the plural defects in the insulating film 17 are short-circuited to some of the plural signal electrodes 14 corresponding to the defects, the short-circuited signal electrodes 14 cannot be short-circuited to one another via the black mask 16. Wrong (or error) control of display images which is caused when voltage supplied to one short-circuited signal electrode 14 is supplied to the remaining short-circuited signal electrodes 14 can be prevented go thereby keep the quality of display high.

Further, each mask unit 16a of the black mask 16 corresponds to the two adjacent signal electrodes 14. When plural defects are produced at that point of the insulating film 17 which is located above one of the mask units 16a, therefore, it is imagined that the two adjacent signal electrodes 14 located above this one mask unit 16a are short-circuited to each other via the plural defects and the mask unit 16a, but it is quite rare that plural defects are concentratedly produced at one point of the insulating film 17. Even if they concentrate on one point of the insulating film 17, only the two adjacent signal electrodes 14 are short-circuited to each other and the whole quality of display images on the display is hardly be influenced.

The liquid crystal display device has the common arrangement of laminating the signal electrodes 14 on the black mask 16 of metal film with the insulating film 17 interposed between them, but even when defects such as the pinholes are produced in the insulating film 17 on the black mask 16 and the black mask 16 is short-circuited to the signal electrodes 14 on the insulating film 17 because of the defects in the insulating film 17, the liquid crystal display device can keep the quality of display higher.

Each of the vertical lines of the black mask 16 is cut off, corresponding substantially to the center of the width of each scanning electrode 13, while each of the horizontal lines thereof is gut off, corresponding substantially to the center of the width of each signal electrode 14 in the case of the above-described liquid crystal display device, but they may be cut off at optional positions.

Figure 7:
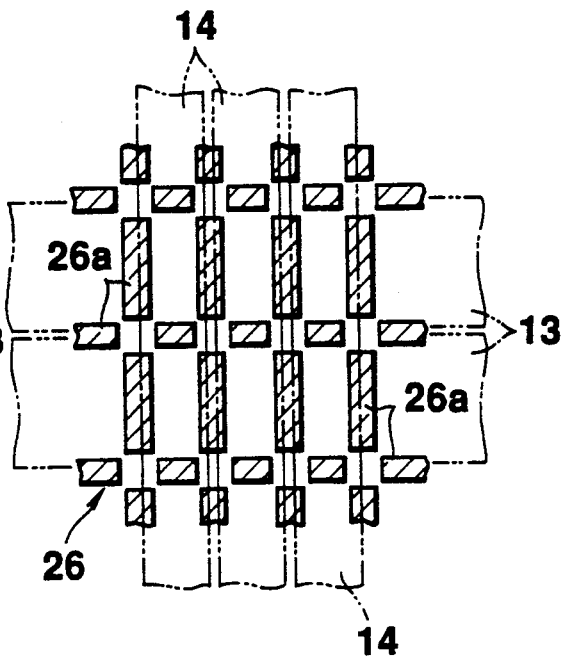
FIG. 7 is a plan view schematically showing a modification of the black mask used in the present invention.

FIG. 7 shows a variation of the black mask according to the present invention. Vertical and horizontal lines of a black mask 26 are separated from their corresponding ones at their crossed portions Plural mask units 26a of the black mask 26 are grouped into vertically long ones and horizontally short ones. In the case of this variation, therefore, the vertical lines of the black mask 26 are cut off at their portions crossed with the horizontal lines thereof and same thing can be said about the horizontal lines. This variation of the black mask enables to obtain the same merits as those in the first case.

Figure 8:
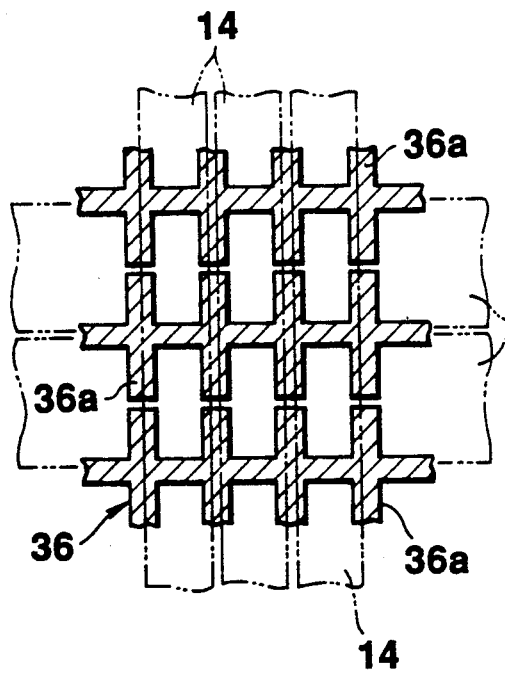
FIG. 8 is a plan view schematically showing another modification of the black mask used in the present invention.
Figure 9:
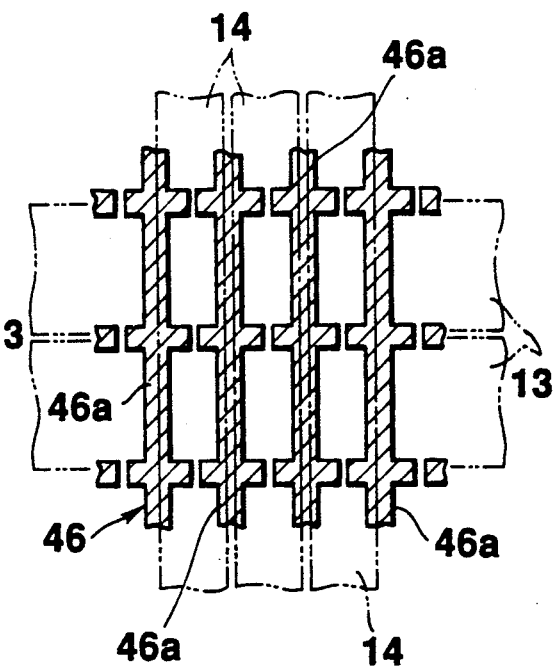
FIG. 9 is a plan view schematically showing a further modification of the black mask used in the present invention.

Vertical and horizontal lings of the black masks 16 and 26 have been cut off from their corresponding ones in the above-described device and variation of the black mask, but cutting may be applied only to the vertical or horizontal lines of the black masks 16 and 26. In another variation of the black mask shown in FIG. 8, vertical lines of a black mask 36 are cut off at a plurality of positions along the signal electrodes 14 but horizontal lines thereof are left being continuous along the scanning electrodes 13. In short, a mask unit 36a extends along the clearance between the two adjacent scanning electrodes 13. FIG. 9 shows a further variation of the black mask, in which horizontal lines of a black mask 46 are cut off at a plurality of positions along the scanning electrodes 13 but vertical lines thereof are left being continuous along the signal electrodes 14. In short, a mask unit 46a extends along the clearance between the two adjacent signal electrodes In the case of the two variations shown in FIGS. 8 and 9, horizontal or vertical lines of the black masks 36 and 46 are cut off at a plurality of positions along the scanning or signal electrodes. Even if plural defects are produced in the film 17 which insulates the black masks 36 or 46 from the signal electrodes 14, therefore, only one of the vertically or horizontally extending plural mask units 36a or 46a of the black masks 36 or 46 is caused to have potential because of voltage supplied to the signal electrodes 14 which correspond to the defects in the insulating film 17. Therefore, the display area which adds influence to the quality of display images can be kept the smallest to thereby keep the quality of display images high. Further, even when the signal electrodes 14 are short-circuited to the black mask 36 or 46 at plural points because of plural defects produced in the insulating film 17, the black mask 36 or 46 is discontinuous in the vertical or horizontal direction and this prevents the plural signal electrodes 14 from being short-circuited to one another throughout the vertical or horizontal line of the black mask 36 or 46. Therefore, the lowering of display quality caused by the plural defects in the insulating film 17 can be prevented and the area of display images wrongly controlled can be reduced or eliminated except the case where the plural defects are produced in the direction in which a mask unit 36a or 46a extends continuously.

When the horizontal lines o& the black mask 46 crossing the direction in which the signal electrodes 14 extend are cut off and the mask units 46a are thus left being continuous in this direction, particularly as shown in FIG. 9, potential is same at everywhere on one signal electrode 14 even if this one signal electrode 14 is short-circuited to the black mask 46 at plural points because of defects in the insulating film 17. Wrong or error control of display images caused by these defects in the insulating film 17 can be eliminated. It is therefore preferable to cut off whose lines of the black mask which cross the extending direction of the display electrodes 13 or 14 above the black mask.

Figure 10:
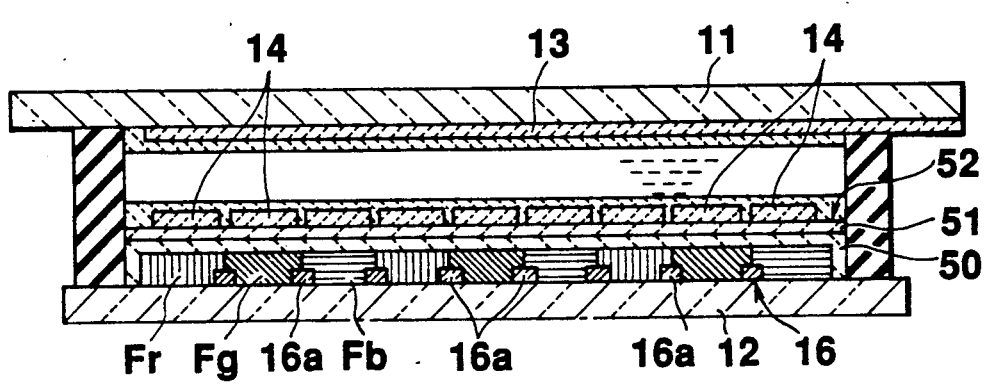
FIG. 10 is a sectional view schematically showing a part of a liquid crystal display device according to another embodiment of the present invention.

The present invention can be applied to a liquid crystal display device provided with a color filter. FIG. 10 shows another embodiment where the present invention is applied to the liquid crystal color display device. Same components as those in the first embodiment shown in FIGS. 4 through 6 gill be denoted by same reference numerals and description on these components will be omitted.

A black mask 16 similar to the above-described one is formed on the opposing surface (upper surface in FIG. 10) of the substrate 12. Red, green and blue filters Fr, Fg and Fb are formed in this order on the opposing surface of the substrate 12, using the black mask 16 as their border along the display electrodes 14. A layer of color filters is thus formed on the opposing surface of the substrate 12. Formed on the color filter layer is a protection layer 52 including a first insulating protection film 50 made of organic material (such as polyimide resin) and a second insulating protection film 51 made of inorganic material (such as $SiO_2$). The display electrodes 14 (signal electrodes, for example) similar to those in the above-described first embodiment are formed on the protection layer 52.

In the case of the liquid crystal display device provided with the color filter layer, the color filter layer has a low transitivity of light. When light leaks from peripheries of image elements, therefore, the contrast of displayed images is remarkably lowered. According to the second embodiment of the present invention shown in FIG. 10, however, the light can be shielded from being passed through the peripheries of the image elements by the black mask 16 to thereby enhance the contrast of images on the whole of the display. In a case where defects such as cracks are produced in the color filter layer and the protection layer 52 both of which are lamingted one upon the other between the plural signal electrodes 14 and the black mask 16, as shown in the second embodiment in FIG. 10, the wrong or error control of display images can be avoided and the area of lowering the quality of display can be kept as small as possible because vertical and horizontal lines of the black mask 16 are cut off to form a plurality of mask units 16a.

The color filters Fr, Fg and Fb in the second embodiment shown in FIG. 10 are colored organic or inorganic films. The protection layer 52 can be formed as a single layer film made of organic or inorganic material.

In the embodiments and their variations shown in FIGS. 4 through 10, the black mask 16, 26, 36 or 46 is formed on the substrate 12 and the signal electrodes 14 are formed on this black mask with the insulating film 17 interposed between them. However, the present invention can be applied to the liquid crystal display device in which the signal electrodes 14 are formed at first on the opposing surface of the substrate 12 and the black mask 16, 26, 36 or 46 is then formed on the signal electrodes 14, interposing the insulating film 17 between them. In other words, the present invention can be applied to any of the liquid crystal display devices which are designed to laminate the black mask and the display electrodes one upon the other with the insulating film interposed between them. Needless to say, the display electrodes may serves as signal or scanning ones in this case.

Although the black mask 16 gas been formed on the opposing surface of one 12 of the paired substrates 11 and 12 in the above-described embodiments, the black mask 16 may be formed on both opposing surfaces of the substrates 11 and 12. When cut-off portions of the black mask 16 formed on the opposing surface of the base plate 11 are arranged not to oppose those of the black mask 16 formed on the opposing surface of the substrate 12, light passing through the cut-off portions of one black mask can be shielded by the other black mask.

Although description has been made about some liquid crystal display devices of the simple matrix type, the present invention can also be applied to the liquid crystal display devices of the TFT active matrix type in which a thin film transistor (TFT) is arranged every electrode which forms an image element, and these TFTs are made operative to select image electrodes.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A liquid crystal display device having a plurality of image elements arranged like a matrix, comprising:
   a pair of substrates arranged to oppose to each other;
   a plurality of first electrodes mounted over one of the paired substrates;
   at least one second electrode mounted over the other of the paired substrates to oppose to the plurality of first electrodes;
   liquid crystal material interposed between the first and second electrodes, and the plural areas of said liquid crystal material corresponding to the portions of the first and second plural electrodes which are opposed to each other form plural image elements and the light transmission of said plural image elements are selectively controlled by selectively supplying a current or a voltage having a predetermined value of the first and second electrodes;
   an electrically conductive opaque member mounted on at least one of the paired substrates so as to have a discontinuous pattern having pattern portions which extend in row and column directions of said matrix between the adjacent image elements to substantially shield light passing through clearances between the adjacent image elements, at least one of said row and column direction extending pattern portions of said discontinuous pattern of said electrically conductive opaque member being cut at a plurality of positions along a direction which is perpendicular to an extending direction of at least one of extending pattern portions, to thereby form said electrically conductive opaque member into discrete portions; and an electrically insulating member interposed between the electrically conductive opaque member and the plurality of first electrodes.

2. The liquid crystal display device according to claim 1, wherein said opaque member comprises a metal film.

3. The liquid crystal display device according to claim 1, wherein said first electrodes comprise plural pieces of transparent electrically conductive film formed over said one of the substrates, extending in a predetermined direction; and said second electrodes comprise plural pieces of transparent electrically conductive film formed over said other substrate, extending in a direction perpendicular to the predetermined direction.

4. The liquid crystal display device according to claim 3, wherein said opaque member extends in one and another directions, said another direction being perpendicular to said one direction, and is cut off at a plurality of positions along said one and said another directions, so that said opaque member has a discontinuous pattern.

5. The liquid crystal display device according to claim 1, wherein said opaque member extends in one and another direction, said another direction being perpendicular to said one direction, and is cut off at a plurality of positions along said one or said another direction, so that said opaque member has a discontinuous pattern.

6. The liquid crystal display device according to claim 1, wherein said opaque member is made continuous in a direction in which the first electrodes extend but discontinuous in another direction perpendicular to the extending direction of the first electrodes.

7. The liquid crystal display device according to claim 6, wherein said first electrodes serve as signal electrodes.

8. The liquid crystal display device according to claim 1, wherein said opaque member extends in a first direction, in which the first electrodes extend, and in a second direction perpendicular to the extending direction of the first electrodes, and is cut off at a plurality positions along said first and second directions.

9. The liquid crystal display device according to claim 1, wherein said opaque member is cut off at a plurality of positions corresponding to the portions at which the clearances extending between adjacent image elements in one direction and the other clearances extending between adjacent image elements in another direction perpendicular to said one direction.

10. The liquid crystal display device according to claim 1, wherein said insulating member includes a color filter layer.

11. The liquid crystal display device according to claim 10, wherein said color filter layer includes a plurality of single-color filters different in color and arranged like stripes so as to correspond to the second electrodes.

12. The liquid crystal display device according to claim 1, wherein said insulating member includes a plurality of the color filters having a plurality of colors; and a protection layer for protecting the color filters.

13. The liquid crystal display device according to claim 12, wherein said protection layer comprises a first protection film made of organic material; and a second protection film made of inorganic material.

* * * * *